United States Patent

Dollman et al.

[11] Patent Number: 5,534,082
[45] Date of Patent: *Jul. 9, 1996

[54] COMPOSITION AND PROCESS FOR TREATING METAL

[75] Inventors: David Y. Dollman, deceased, late of Bloomsburg, Pa., by Betty Dollman, executrix; Shawn E. Dolan, Sterling Heights, Mich.; Lester E. Steinbrecher, North Wales, Pa.

[73] Assignee: Henkel Corporation, Plymouth Meeting, Pa.

[*] Notice: The term of this patent shall not extend beyond the expiration date of Pat. No. 5,356,490.

[21] Appl. No.: 429,431

[22] Filed: Apr. 21, 1995

Related U.S. Application Data

[63] Continuation of Ser. No. 213,138, Mar. 15, 1994, abandoned, which is a continuation-in-part of Ser. No. 131,645, Oct. 5, 1993, Pat. No. 5,356,490, which is a continuation-in-part of Ser. No. 862,012, Apr. 1, 1992, Pat. No. 5,281,282.

[51] Int. Cl.[6] .................................... C23C 22/48
[52] U.S. Cl. .................... 148/247; 148/251; 148/264; 148/269; 148/275; 148/281; 148/282
[58] Field of Search .................... 148/247, 251, 148/264, 269, 275, 281, 282; 427/435

[56] References Cited

U.S. PATENT DOCUMENTS

| | | | |
|---|---|---|---|
| 3,682,713 | 8/1972 | Ries et al. | 148/6.14 |
| 3,695,942 | 10/1972 | Binns | 148/6.15 |
| 3,850,732 | 11/1974 | Binns | 204/181 |
| 3,873,349 | 3/1975 | Kimura et al. | 148/253 |
| 3,912,548 | 10/1975 | Faigen | 148/6.15 |
| 3,964,936 | 6/1976 | Das | 148/6.27 |
| 4,136,073 | 1/1979 | Muro et al. | 260/29.2 |
| 4,148,670 | 4/1979 | Kelly | 148/6.15 |
| 4,191,596 | 3/1980 | Dollman et al. | 148/251 |
| 4,370,173 | 1/1983 | Dollman | 134/3 |
| 4,719,038 | 1/1988 | Sobata et al. | 252/511 |
| 4,762,638 | 8/1988 | Dollman et al. | 252/135 |
| 4,963,596 | 10/1990 | Lindert et al. | 526/313 |
| 5,158,622 | 10/1992 | Reichgott et al. | 148/251 |
| 5,281,282 | 1/1994 | Dolan et al. | 148/251 |
| 5,356,490 | 10/1994 | Dolan et al. | 148/251 |

FOREIGN PATENT DOCUMENTS

WO85/05131  11/1985  WIPO.

*Primary Examiner*—David A. Simmons
*Assistant Examiner*—Robert R. Koehler
*Attorney, Agent, or Firm*—Wayne C. Jaeschke; Norvell E. Wisdom, Jr.; Rudolf E. Hutz

[57] ABSTRACT

Heating an aqueous mixture of a fluoroacid such as $H_2TiF_6$ and an oxide, hydroxide, and/or carbonate such as silica produces a clear mixture with long term stability against settling of any solid phase, even when the oxide, hydroxide, or carbonate phase before heating was a dispersed solid with sufficiently large particles to scatter light and make the mixture before heating cloudy. The clear mixture produced by heating can either be mixed with water soluble and/or water dispersible polymers, for example with dispersed polymers of the diglycidyl ether of bisphenol-A or an acrylic acid polymer, or with soluble hexavalent and/or trivalent chromium, to produce a composition that improves the corrosion resistance of metals treated with the composition, especially after subsequent painting. Another composition that improves the corrosion resistance of metals after contact with them is an aqueous solution of a mixture of: (A') a water soluble or dispersible polymer having at least one —OH group per polymer molecule selected from the group consisting of polyvinyl alcohol, polyethylene glycol, modified starch, and mixtures thereof, and (B') polymers and copolymers of acrylic and methacrylic acid and their salts.

40 Claims, No Drawings

COMPOSITION AND PROCESS FOR TREATING METAL

This application is a continuation of application Ser. No. 08/213,138, filed on Mar. 15, 1994, now abandoned, which was a continuation-in-part of application Ser. No. 08/131,645, filed on Oct. 5, 1993, now U.S. Pat. No. 5,356,490, which was a continuation-in-part of application Ser. No. 07/862,012, filed on Apr. 1, 1992, now U.S. Pat. No. 5,281,282.

BACKGROUND OF THE INVENTION

1. Field of the Invention

This invention relates to processes of treating metal surfaces with aqueous acidic compositions to increase the resistance to corrosion of the treated metal surface, either as thus treated or after subsequent overcoating with some conventional organic based protective layer. A major object of the invention is to provide a storage stable, preferably single package, treatment that can be substantially free from hexavalent chromium but can protect metals substantially as well as the hexavalent chromium containing treatments of the prior art, or can improve the stability of treatment solutions that do contain hexavalent chromium. This invention also relates to reaction of fluorometallic acids with other metal or metalloid containing materials to produce compositions or intermediates for compositions useful for such treatments.

2. Statement of Related Art

A very wide variety of materials have been taught in the prior art for the general purposes of the present invention, but most of them contain hexavalent chromium or other inorganic oxidizing agents which are environmentally undesirable. Also, many of the prior art treatment compositions include components that are chemically or physically unstable when mixed, so that single package concentrates for such treatment compositions are not practical.

DESCRIPTION OF THE INVENTION

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes oligomer; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole (any counterions thus implicitly specified should preferably be selected from among other constituents explicitly specified in ionic form, to the extent possible; otherwise such counterions may be freely selected, except for avoiding counterions that act adversely to the stated objects of the invention); and the term "mole" and its variations may be applied to elemental, ionic, and any other chemical species defined by number and type of atoms present, as well as to compounds with well defined molecules.

SUMMARY OF THE INVENTION

It has been found that aqueous compositions comprising (A) a component of dissolved fluoroacids of one or more metals and metalloid elements selected from the group of elements consisting of titanium, zirconium, hafnium, boron, aluminum, silicon, germanium, and tin and, (B) a component of one or more of (i) dissolved or dispersed finely divided forms of metals and metalloid elements selected from the group of elements consisting of titanium, zirconium, hafnium, boron, aluminum, silicon, germanium, and tin and (ii) the oxides, hydroxides, and carbonates of such metals and metalloid elements can be caused to chemically interact in such a manner as to produce a composition useful for novel metal treatments. If component (B) is present in dispersion rather than solution, as is generally preferred, the initial composition normally will not be optically transparent, because of the scattering of visible light, in a thickness of 1 centimeter ("cm"), and the occurrence of the desired chemical interaction can be determined by the clarification of the composition. If components (A) and (B) as defined above are both present in the precursor aqueous composition in sufficiently high concentrations, adequate chemical interaction between them may occur at normal ambient temperatures (i.e., 20°–25 ° C.) within a practical reaction time of 24 hours or less, particularly if component (B) is dissolved or dispersed in very finely divided form. Mechanical agitation may be useful in speeding the desired chemical interaction and if so is preferably used. Heating, even to relatively low temperatures such as 30° C., is often useful in speeding the desired chemical interaction, and if so is also preferred. The desired chemical interaction between components (A) and (B) of the mixed composition eliminates or at least markedly reduces any tendency toward settling of a dispersed phase that might otherwise occur upon long term storage of the initial mixture of components (A) and (B) as defined above.

The compositions resulting from chemical interaction as described above may then be utilized as metal treating compositions, optionally after being combined with a component (C) that is either (i) a water soluble or dispersible polymer and/or copolymer, preferably selected from the group consisting of (i.1) polymers and copolymers of one or more x-(N-$R^1$N-$R^2$-aminomethyl)-4-hydroxy-styrenes, where x=2, 4, 5, or 6, $R^1$ represents an alkyl group containing from 1 to 4 carbon atoms, preferably a methyl group, and $R^2$ represents a substituent group conforming to the general formula H(CHOH)$_n$CH$_2$—, where n is an integer from 1 to 7, preferably from 3 to 5, (i.2) epoxy resins, particularly polymers of the diglycidylether of bisphenol-A, optionally capped on the ends with non-polymerizable groups and/or having some of the epoxy groups hydrolyzed to hydroxyl groups, and (i.3) polymers and copolymers of acrylic and methacrylic acids and their salts; or (ii) a composition containing hexavalent chromium, and, optionally but preferably, trivalent chromium.

Optionally, another component (D) made up of water soluble oxides, carbonates, or hydroxides of at least one of Ti, Zr, Hf, B, Al, Si, Ge, and Sn may also be added before, after, or simultaneously with component (C) but after the interaction of components (A) and (B). For this purpose, "water soluble" means a solubility to at least 1% in water at normal ambient temperature, and "water insoluble" means less soluble than this.

The resulting compositions are suitable for treating metal surfaces to achieve excellent resistance to corrosion, particularly after subsequent conventional coating with an organic binder containing protective coating. The compositions are particularly useful on iron and steel, galvanized iron and steel, zinc and those of its alloys that contain at least 50 atomic percent zinc, and, most preferably, aluminum and its alloys that contain at least 50 atomic percent aluminum. The treating may consist either of coating the metal with a liquid film of the composition and then drying this liquid film in place on the surface of the metal, or simply contacting the metal with the composition for a sufficient time to produce an improvement in the resistance of the surface to corrosion, and subsequently rinsing before drying. Such contact may be achieved by spraying, immersion, and the like as known per se in the art. When this latter method is used, it is optional, and often advantageous, to contact the metal surface with an aqueous composition comprising polymers and copolymers of one or more x-(N-$R^1$-N-$R^2$-aminomethyl)-4-hydroxy-styrenes, where x=2, 4, 5, or 6, $R^1$ represents an alkyl group containing from 1 to 4 carbon atoms, preferably a methyl group, and $R^2$ represents a substituent group conforming to the general formula $H(CHOH)_nCH_2$—, where n is an integer from 1 to 7, preferably from 3 to 5, after contacting the metal with a composition containing components (A) and (B) as described above, removing the metal from contact with this composition containing components (A) and (B) as described above, and rinsing with water, but before drying.

The invention also provides a process for effectively coating the above-stated metallic surfaces in the absence of an intermediate rinsing step. The process comprises the steps of (i) cleaning the metal surface to be coated, (ii) rinsing the cleaned metal surface with water so as to remove any excess cleaning solution, (iii) contacting the metallic surface with the above-described coating composition, and (iv) drying the coated metallic surface.

There is also another embodiment of the present invention which provides a composition and process for coating surfaces of aluminum and alloys thereof, wherein the composition comprises, preferably consists essentially of, or more preferably consists of, water and a mixture of: (A') a water soluble or dispersible polymer having at least one alcohol functionality selected from the group consisting of polyvinyl alcohol, polyethylene glycol, modified starch, and mixtures thereof and (B') polymers and copolymers of acrylic and methacrylic acid and their salts, and, optionally, one or more of the following: a component (C') selected from the group consisting of the same fluorometallic acids, with the same preferences, as recited for component (A) herein; a component (D') of metallic and/or metalloid elements and their oxides, hydroxides, and/or carbonates, with the same preferences, as recited for component (B) herein; and a component (E') selected from the group consisting of water soluble oxides, carbonates, or hydroxides of at least one of Ti, Zr, Hf, B, Al, Si, Ge, and Sn as recited for component (D) herein.

It should be understood that the descriptions of compositions above do not preclude the possibility of unspecified chemical interactions among the components listed, but instead describes the components of a composition according to the invention in the form in which they are generally used as ingredients to prepare such a composition. In fact, a chemical interaction, most probably to produce oxyfluro complexes of the metal or metalloid elements or their compounds heated in contact with fluorometallic acids, is believed to occur, but the invention is not limited by any such theory.

DESCRIPTION OF PREFERRED EMBODIMENTS

To the extent that their water solubility is sufficient, the fluoroacid component (A) to be caused to interact in a mixture with one or more metals and/or metalloid elements and/or oxides, hydroxides, and/or carbonates thereof in a process according to one embodiment of the invention may be freely selected from the group consisting of $H_2TiF_6$, $H_2ZrF_6$, $H_2HfF_6$, $H_3AlF_6$, $H_2SiF_6$, $H_2GeF_6$, $H_2SnF_6$, $HBF_4$, and mixtures thereof. $H_2TiF_6$, $H_2ZrF_6$, $H_2SiF_6$, $H_2SiF_6$, $HBF_4$, and mixtures thereof are preferred; $H_2TiF_6$, $H_2ZrF_6$, $H_2SiF_6$ and mixtures thereof are more preferred; and $H_2TiF_6$ is most preferred. The concentration of fluoroacid component at the time of interaction is preferably between 0.01 and 7 moles per liter (hereinafter "M"), more preferably between 0.1 and 6M.

The component (B) of metallic and/or metalloid elements and/or their oxides, hydroxides, and/or carbonates is preferably selected from the group consisting of the oxides, hydroxides, and/or carbonates of silicon, zirconium, and/or aluminum and more preferably includes silica. Any form of this component that is sufficiently finely divided to be readily dispersed in water may be used in a process according to one embodiment of this invention, but for constituents of this component that have low solubility in water it is preferred that the constituent be amorphous rather than crystalline, because crystalline constituents can require a much longer period of heating and/or a higher temperature of heating to produce a composition that is no longer susceptible to settling and optically transparent. Solutions and/or sols such as silicic acid sols may be used, but it is highly preferable that they be substantially free from alkali metal ions as described further below. However, it is generally most preferred to use dispersions of silica made by pyrogenic processes.

An equivalent of a metallic or metalloid element or of its oxide, hydroxide, or carbonate is defined for the purposes of this description as the amount of the material containing a total of Avogadro's Number (i.e., $6.02 \times 10^{23}$) of atoms of metal and/or metalloid elements from the group consisting of Ti, Zr, Hf, B, Al, Si, Ge, and Sn. The ratio of moles of fluoroacid component (A) to total equivalents of component (B) in an aqueous composition heated according to one embodiment of this invention preferably is from 1:1 to 50:1, more preferably from 1.5:1.0 to 20:1, or still more preferably from 1.5:1 to 5.0:1.0. If desired, a constituent of this component may be treated on its surface with a silane coupling agent or the like which makes the surface oleophilic.

According to one embodiment of the invention, an aqueous liquid composition comprising, preferably consisting essentially of, or more preferably consisting of, water and components (A) and (B) as described above, which composition scatters visible light, is not optically transparent in a thickness of 1 cm, and/or undergoes visually detectable settling of a solid phase if maintained for at least 100 hours at a temperature between its freezing point and 20° C., is maintained at a temperature of at least 21° C., optionally with mechanical agitation, for a sufficient time to produce a composition that (i) does not suffer any visually detectable settling when stored for a period of 100, or more preferably 1000, hours and (ii) is optically transparent in a thickness of 1 cm. Preferably, the temperature at which the initial mixture of components (A) and (B) is maintained is in the range from 25° to 100° C., or more preferably within the range from 30° to 80° C., and the time that the composition is maintained within the stated temperature range is within the range from 3 to 480, more preferably from 5 to 90, or still more preferably from 10 to 30, minutes (hereinafter often abbreviated "min"). Shorter times and lower temperatures within these ranges are generally adequate for converting compositions in which the component (B) is selected only from dissolved species and/or dispersed amorphous species without any surface treatment to reduce their hydrophilicity, while longer times and/or higher temperatures within these ranges are likely to be needed if component (B) includes dispersed solid crystalline materials and/or solids with surfaces treated to reduce their hydrophilicity. With suitable equipment for pressurizing the reaction mixture, even higher temperatures than 100° C. can be used in especially difficult cases.

Independently, it is preferred that the pH of the aqueous liquid composition combining components (A) and (B) as described above be kept in the range from 0 to 4, more preferably in the range from 0.0 to 2.0, or still more preferably in the range from 0.0 to 1.0 before beginning maintenance at a temperature of at least 21 ° C. as described above.

A composition made as described immediately above is suitable for use as a protective treatment for metals. In many cases, however, a better protective treatment composition may be obtained by mixing the product of interaction between components (A) and (B) as described above with a third component (C) as also noted above. To make such compositions including component (C), after maintenance of a composition containing components (A) and (B) as described above at a temperature and for a time sufficient to promote their interaction, the composition is preferably brought if necessary to a temperature below 30° C. and then mixed with a component consisting of at least one of (i) at least one water soluble or dispersible polymer and/or copolymer, preferably selected from the group consisting of (i.1) polyhydroxyl alkylamino derivatives of poly{p-hydroxystyrene} as described above and, in more detail, in U.S. Pat. No. 4,963,596, the entire disclosure of which, except to the extent contrary to any explicit statement herein, is hereby incorporated herein by reference, (i.2) epoxy resins, particularly polymers of the diglycidylether of bisphenol-A, optionally capped on the ends with non-polymerizable groups and/or having some of the epoxy groups hydrolyzed to hydroxyl groups, and (i.3) polymers and copolymers of acrylic and methacrylic acids and their salts; and (ii) a composition containing hexavalent chromium, and, optionally but preferably, trivalent chromium as known per se in the art for treating metals, particularly aluminum and its alloys, to retard corrosion thereon. Suitable and preferred water soluble polymers and methods of preparing them are described in detail in U.S. Pat. No. 4,963,596. Preferably, the ratio by weight of the solids content of component (C) to the total of active ingredients of component (A) as described above is in the range from 0.1 to 3, more preferably from 0.2 to 2, or still more preferably from 0.20 to 1.6.

A composition prepared by a process as described above constitutes another embodiment of this invention. It is normally preferred that compositions according to the invention as defined above should be substantially free from many ingredients used in compositions for similar purposes in the prior art. Specifically, it is often increasingly preferred in the order given, independently for each preferably minimized component listed below, that these compositions, when directly contacted with metal in a process according to this invention, contain no more than 1.0, 0.35, 0.10, 0.08, 0.04, 0.02, 0.01, or 0.001% of each of the following constituents: hexavalent chromium; ferricyanide; ferrocyanide; anions containing molybdenum or tungsten; nitrates and other oxidizing agents (the others being measured as their oxidizing stoichiometric equivalent as nitrate); phosphorus and sulfur containing anions that are not oxidizing agents; alkali metal and ammonium cations; and organic compounds with two or more hydroxyl groups per molecule and a molecular weight of less than 300. The preference for minimal amounts of alkali metal and ammonium cations applies only to compositions used for processes according to the invention that include drying into place on the metal surface to be treated without rinsing after contact between the metal surface and the composition containing at least components (A) and (B) as described above; when a composition according to the invention is contacted with a metal surface and the metal surface is subsequently rinsed with water before being dried, any alkali metal and ammonium ions present are usually removed by the rinsing to a sufficient degree to avoid any substantial diminution of the protective value of subsequently applied organic binder containing protective coatings. Also, the preference for minimization of the amount of hexavalent chromium present is due to the polluting effect of hexavalent chromium, and where there is an absence of legal restraints against pollution and/or sufficiently economical means of disposing of the hexavalent chromium without environmental damage exist, this preference does not apply. In fact, in one specialized embodiment of the invention, as already noted above, hexavalent chromium may advantageously be incorporated into working compositions according to this invention themselves, and in another specialized embodiment of the invention, liquid compositions containing hexavalent chromium may be used as posttreatments after application of a coating according to this invention but before final overcoating with a paint or the like, in order further to improve corrosion resistance of the metal surface treated.

The other major type of coating used in the invention, employing a coating composition including necessary components (A') and (B') as already described above, has been found to be especially useful for treating metallic surfaces that are exposed to alkali metal ions, particularly sodium such as often occurs in detergents and other cleaners, after the treatment with a composition according to this invention has been completed. (Protective coatings applied to metallic surfaces, particularly aluminum, preferably are water insoluble and inhibit corrosion. However, metallic surfaces bearing a protective coating are often exposed to sodium ions later. It is believed that, upon exposure of some prior art coatings to sodium ions, the sodium ions oftentimes at least partially replace the aluminum in the formed coating, much as in an ion-exchange resin; such replacement in turn causes the film coating to be water sensitive, by increasing its solubility in water.)

In an effort to decrease adverse effects of alkali metal ions on the treated surfaces, it has been found that by combining polymers and copolymers of acrylic and methacrylic acids and their salts having an average molecular weight of about 50,000, with a water soluble or dispersible polymer having at least one —OH group per polymer molecule, synergy occurs between the two, causing the acrylic acid to crosslink which in turn protect the coating composition from such ion-exchange. Possibly this occurs because the alcohol functionality cross-links by esterification with the acid functions. In a particularly preferred embodiment of this aspect of the invention, the composition contacted with a metallic surface comprises water and: (A') from 0.5 to 50 g/l and (B')

from 0.5 to 50, and more preferably from 0.5 to 16 g/l of polyvinyl alcohol. The polyvinyl alcohol used in the invention preferably is a low molecular weight polyvinyl alcohol which is 75 –99+ mole % hydrolyzed, and has an average degree of polymerization ranging from 100–600.

While any water soluble or dispersible polymer having at least one —OH group per polymer molecule may be employed without departing from the spirit of the invention, preferred polymers and amounts thereof include the above-stated polyvinyl alcohol; from 0.3 to 16 g/l, preferably from 0.3 to 1.2 g/l, of polyethylene glycol having a molecular weight of from 90,000 to 900,000; from 0.5 to 16 g/l, and preferably from 0.5 to 10 g/l of dextrin, cyclodextrin, or a modified starch.

The term "modified starch" is one commonly known in the art. It refers to any of several water-soluble polymers derived from a starch by acetylation, chlorination, acid hydrolysis, or enzymatic action. These reactions yield starch acetates, esters, and ethers in the form of stable and fluid solutions and films. These starch derivatives useful herein are well known.

The hydroxyalkyl starch ethers and starch esters can be obtained by known etherification and esterification processes. These starch ethers and esters should have a degree of substitution (hereinafter often abbreviated "D.S.") of 0.01 to 0.5, and preferably 0.1 to 0.5. As used herein D.S. means the average degree of substitution of starch hydroxyl groups per anhydroglucose unit of the chemical modifying substituent, as for example a hydroxyalkyl or carbonyl group.

Oxidized starch can be obtained by known processes involving oxidation of starch with a suitable oxidizing agent, as for example sodium hypochlorite, potassium dichromate and sodium permanganate. The starch can be oxidized under acid, alkaline or neutral conditions, and the resulting product can contain carboxyl and carbonyl groups. Preferably the oxidized starch has a "D.O." value of 0.01 to 1.0, where "D.O." refers to the number of carboxyl groups introduced per anhydroglucose unit. These starch derivatives and methods for obtaining them are discussed in Whistler and Paschall (eds.), *Starch: Chemistry and Technology*, vol. I, (Academic Press, 1965), pp. 458–478.

Dextrins and cyclodextrins are polysaccharide products of a complex nature resulting from the partial degradation of starch, such as corn starch, potato starch, wheat starch, and the like, with heat, as for example, by roasting with acid or alkaline catalysts. Linear and branched dextrins are classified in three types. The particular type obtained depends on the heating time, temperature, and catalyst employed in the treatment of the starch. These types are classified as white dextrins, yellow or canary dextrins, and British gums, and all such dextrins are suitable herein. White and canary dextrins are preferred in that British gums are brown in color. White dextrins are preferably pregelatinized (made water soluble during manufacture), if necessary, to render them more readily mixed with other water soluble components. Dextrins and methods for obtaining them are well known. See, for example, Whistler and Paschall op. cit., vol. I, p. 421 ff and vol. II, p. 253 ff.

The starch hydrolysates useful in the compositions of this invention are a relatively new class of starch materials. These starch hydrolysates are made by subjecting a source of starch, such as hereinbefore mentioned, to enzyme or acid treatment or a combination of both. It is important that the starch hydrolysate have a relatively low dextrose equivalent (hereinafter often abbreviated "D.E."). The starch hydrolysate should have a D.E. of from 2 to 35, and preferably have a D.E. of from 5 to 25. The most preferred materials have a D.E. within the range of 5 to 15. (The term D.E. is used herein to refer to the reducing sugars content of the dissolved solids in a starch hydrolysate expressed as percent dextrose as measured by the Luff-Schoorl method [NBS Circular C-40, p. 195; also appearing in *Polarimetry, Saccharimetry, and the Sugars* published by Frederick J. Bates and Associates].)

Particularly preferred modified starches include cyclodextrins, which are macrocyclic non-reducing D-glucosyl polymers containing six or more D-glucosyl residues bonded by $\alpha$-(1,4) links. A more detailed description of cyclodextrins can be found in Whistler and Paschall, op. cit., Vol. 1, pp. 209–224.

The pH of a composition according to this invention that contains components (A') and (B') as necessary components preferably is in the range from 1.0 to 5.0, and more preferably from 1.0 to 3.5.

In a preferred embodiment of the aspect of the invention utilizing necessary components (A') and (B'), the treating composition also includes from 0.2 to 19.0, and more preferably from 0.2 to 8.0 g/l, of fluoroacids component (C') admixed therein. Component (C') is preferably selected from the group consisting of $H_2TiF_6$, $H_2ZrF_6$, and $H_2SiF_6$, and more preferably is $H_2TiF_6$ or $H_2ZrF_6$.

Still another embodiment of the invention is a process of treating a metal with a composition prepared as described above. In one embodiment of the invention, it is preferred that the aqueous composition as described above be applied to the metal surface and dried in place thereon. For example, coating the metal with a liquid film may be accomplished by immersing the surface in a container of the liquid composition, spraying the composition on the surface, coating the surface by passing it between upper and lower rollers with the lower roller immersed in a container of the liquid composition, and the like, or by a mixture of methods. Excessive amounts of the liquid composition that might otherwise remain on the surface prior to drying may be removed before drying by any convenient method, such as drainage under the influence of gravity, squeegees, passing between rolls, and the like.

If the surface to be coated is a continuous flat sheet or coil and precisely controllable coating techniques such as gravure roll coaters are used, a relatively small volume per unit area of a concentrated composition may effectively be used for direct application. On the other hand, if the coating equipment used does not readily permit precise coating at low coating add-on liquid volume levels, it is equally effective to use a more dilute acidic aqueous composition to apply a thicker liquid coating that contains the same amount of active ingredients. In either case, it is preferred that the total amount of active ingredients of components (A), (B), and (C) and described above dried into place on the surface to be treated fall into the range of from 1 to 500, more preferably from 5 to 300, still more preferably from 5 to 150, milligrams per square meter (hereinafter often abbreviated as "$mg/m^2$") of surface area treated.

Drying may be accomplished by any convenient method, of which many are known per se in the art; examples are hot air and infrared radiative drying. Independently, it is preferred that the maximum temperature of the metal reached during drying fall within the range from 30 to 200, more preferably from 30 to 150, still more preferably from 30° to 75° C. Also independently, it is often preferred that the drying be completed within a time ranging from 0.5 to 300, more preferably from 2 to 50, still more preferably from 2 to 10, seconds (hereinafter abbreviated "sec") after coating is completed.

According to an alternative embodiment of the invention, the metal to be treated preferably is contacted with a composition prepared as described above at a temperature within the range from 25 to 90, more preferably from 30 to 85, still more preferably from 30° to 60° C. for a time ranging from 1 to 1800, more preferably from 1 to 300, still more preferably from 3 to 30, sec, and the metal surface thus treated is subsequently rinsed with water in one or more stages before being dried. In this embodiment, at least one rinse after treatment with a composition according this invention preferably is with aleionized, distilled, or otherwise purified water. Also in this embodiment, it is preferred that the maximum temperature of the metal reached during drying fall within the range from 30 to 200, more preferably from 30 to 150, or still more preferably from 30° to 75° C. and that, independently, drying be completed within a time ranging from to 0.5 to 300, more preferably from 2 to 50, still more preferably from 2 to 10, sec after the last contact of the treated metal with a liquid before drying is completed.

A process according to the invention as generally described in its essential features above may be, and usually preferably is, continued by coating the dried metal surface produced by the treatment as described above with a siccative coating or other protective coating, relatively thick as compared with the coating formed by the earlier stages of a process according to the invention as described above. Such protective coatings may generally, in connection with this invention, be selected and applied as known per se in the art. Surfaces thus coated have been found to have excellent resistance to subsequent corrosion, as illustrated in the examples below. Particularly preferred types of protective coatings for use in conjunction with this invention include acrylic and polyester based paints, enamels, lacquers, and the like.

In a process according to the invention that includes other steps after the formation of a treated layer on the surface of a metal as described above and that operates in an environment in which the discharge of hexavalent chromium is either legally restricted or economically handicapped, it is generally preferred that none of these other steps include contacting the surfaces with any composition that contains more than, with increasing preference in the order given, 1.0, 0.35, 0.10, 0.08, 0.04, 0.02, 0.01, 0.003, 0.001, or 0.0002% of hexavalent chromium. Examples of suitable and preferred chromium free treatments are described in U.S. Pat. No. 4,963,596. However, in certain specialized instances, hexavalent chromium may impart sufficient additional corrosion protection to the treated metal surfaces to justify the increased cost of using and lawfully disposing of it.

Preferably, the metal surface to be treated according to the invention is first cleaned of any contaminants, particularly organic contaminants and foreign metal fines and/or inclusions. Such cleaning may be accomplished by methods known to those skilled in the art and adapted to the particular type of metal substrate to be treated. For example, for galvanized steel surfaces, the substrate is most preferably cleaned with a conventional hot alkaline cleaner, then rinsed with hot water, squeegeed, and dried. For aluminum, the surface to be treated most preferably is first contacted with either an aqueous alkaline cleaning solution in accordance with that disclosed in U.S. Pat. No. 4,762,638, incorporated herein by reference, or an aqueous acidic cleaning solution as disclosed in U.S. Pat. No. 4,370,173, also incorporated herein by reference. With respect to the aqueous acidic cleaning solution, it should also be noted that a source of fluoride such as HF may also be employed to even further enhance the cleaning process. Irrespective of the type of cleaning solution employed, the aluminum is then subjected to a water rinse, after which a composition in accordance with the present invention may then be coated onto the aluminum in accordance with the processes disclosed herein.

The practice of this invention may be further appreciated by consideration of the following, non-limiting, working examples, and the benefits of the invention may be further appreciated by reference to the comparison examples.

GROUP I

Components (A) and (B), with Dry in Place Treatments)

Test Methods and Other General Conditions

Test pieces of Type 3105 aluminum were spray cleaned for 15 seconds at 54.4° C. with an aqueous cleaner containing 28 g/L of PARCO® Cleaner 305 (commercially available from the Parker+Amchem Division of Henkel Corp., Madison Heights, Mich., USA). After cleaning, the panels were rinsed with hot water, squeegeed, and dried before roll coating with an acidic aqueous composition as described for the individual examples and comparison examples below.

For this first group of examples and comparison examples, the applied liquid composition according to the invention was flash dried in an infrared oven that produces approximately 49° C. peak metal temperature. Samples thus treated were subsequently coated, according to the recommendations of the suppliers, with various commercial paints as specified further below.

T-Bend tests were according to American Society for Testing materials (hereinafter "ASTM") Method D4145-83; Impact tests were according to ASTM Method D2794-84E1; Salt Spray tests were according to ASTM Method B-117-90 Standard; Acetic Acid Salt Spray tests were according to ASTM Method B-287-74 Standard; and Humidity tests were according to ASTM D2247-8 Standard. The Boiling water immersion test was performed as follows: A 2T bend and a reverse impact deformation were performed on the treated and painted panel. The panel was then immersed for 10 minutes in boiling water at normal atmospheric pressure, and areas of the panel most affected by the T-bend and reverse impact deformations were examined to determine the percent of the paint film originally on these areas that had not been exfoliated. The rating is reported as a number that is one tenth of the percentage of paint not exfoliated. Thus, the best possible rating is 10, indicating no exfoliation; a rating of 5 indicates 50% exfoliation; etc.

SPECIFIC COMPOSITIONS

Example 1

5.6 parts of amorphous fumed silicon dioxide 396.2 parts of deionized water 56.6 parts of aqueous 60% duotitanic acid (i.e., $H_2TiF_6$)

325.4 parts of deionized water 216.2 parts of an aqueous solution containing a mixture of 4.1 g/l polyacrylic acid and 4.0 g/l polyvinyl alcohol

Example 2

58.8 parts of aqueous 60% duotitanic acid
646.0 parts of deionized water
5.9 parts of amorphous fumed silicon dioxide
10.5 parts of zirconium hydroxide
278.8 parts of the 10% solution of water soluble polymer as used in Example 1.

Example 3

62.9 parts of aqueous 60% fluotitanic acid
330.5 parts of deionized water
6.2 parts of amorphous fumed silicon dioxide
358.9 parts of deionized water
241.5 parts of the 10% water soluble polymer solution as used in Example 1

Example 4

56.4 parts of aqueous 60% fluotitanic acid
56.4 parts of deionized water
2.1 parts of Aerosil™ R-972 (a surface treated dispersed silica)
667.0 parts of aleionized water
218.1 parts of the 10% water soluble polymer solution as used in Example 1

Example 5

58.8 parts of aqueous 60% fluotitanic acid
3.7 parts of amorphous fumed silicon dioxide
10.3 parts of zirconium basic carbonate
647.7 parts of deionized water
279.5 parts of the 10% solution of water soluble polymer as used in Example 1

Example 6

52.0 parts of aqueous 60% fluotitanic acid
297.2 parts of deionized water
3.3 parts of amorphous fumed silicon dioxide
9.1 parts of zirconium basic carbonate
273.6 parts of deionized water
364.8 parts of the 10% solution of water soluble polymer as used in Example 1

Example 7

11.0 parts of fumed amorphous silicon dioxide
241.0 parts of deionized water
114.2 parts of 60% aqueous fluotitanic acid
633.8 parts of an aqueous composition prepared from the following ingredients:
  5.41% of $CrO_3$
  0.59% of pearled corn starch
  94% of water

Example 8

666.0 parts of deionized water
83.9 parts of 60% aqueous fluotitanic acid
5.3 parts of Cab-O-Sil™ M-5 fumed amorphous silicon dioxide
14.8 parts of zirconium basic carbonate
230.0 parts of RDX 68654™ (also known as RIX 95928™) epoxy resin dispersion commercially available from Rhône-Poulenc, containing 40% solids of polymers of predominantly diglycidyl ethers of bisphenol-A, in which some of the epoxide groups have been convened to hydroxy groups and the polymer molecules are phosphate capped

Example 9

656.0 parts of deionized water
183.9 parts of 60% aqueous fluotitanic acid
5.3 parts of Cab-O-Sil™ M-5 fumed amorphous silicon dioxide
14.8 parts of zirconium basic carbonate
240.0 parts of Accumer™ 1510, a commercially available product from Rohm & Haas containing 25% solids of polymers of acrylic acid with a molecular weight of 60,000

Example 10

636.2 parts of deionized water
83.7 parts of 60% aqueous fluotitanic acid
5.3 parts of Cab-O-Sil™ M-5 fumed amorphous silicon dioxide
14.6 parts of zirconium basic carbonate
37.6 parts of the 10% solution of water soluble polymer as used in Example 1
222.6 parts of Accumer™ 1510, a commercially available product from Rohm & Haas containing 25% solids of polymers of acrylic acid with a molecular weight of 60,000

For each of Examples 1–6 and 8–10, the ingredients were added in the order indicated to a container provided with stirring. (Glass containers are susceptible to chemical attack by the compositions and generally should not be used, even on a laboratory scale; containers of austenitic stainless steels such as Type 316 and containers made of or fully lined with resistant plastics such as polymers of tetrafluoroethene or chlorotrifluoroethene have proved to be satisfactory.) In each of these Examples except Example 4, after the addition of the silica component and before the addition of the subsequently listed components, the mixture was heated to a temperature in the range from 38°–43° C. and maintained within that range of temperatures for a time of 20–30 minutes. Then the mixture was cooled to a temperature below 30° C., and the remaining ingredients were stirred in without additional heating, until a clear solution was obtained after each addition.

For Example 4, the $SiO_2$ used was surface modified with a silane, and because of its hydrophobic nature, the mixture containing this form of silica was heated for 1.5 hours at 70° C. to achieve transparency. The remaining steps of the process were the same as for Example 1.

For Example 7, the first three ingredients listed were mixed together and maintained at 40°±5° C. for 20–30 minutes with stirring and then cooled. In a separate container, the $CrO_3$ was dissolved in about fifteen times its own weight of water, and to this solution was added a slurry of the corn starch in twenty-four times its own weight of water. The mixture was then maintained for 90 minutes with gentle stirring at 88°±6° C. to reduce part of the hexavalent chromium content to trivalent chromium. Finally, this mixture was cooled with stirring and then added to the previously prepared heated mixture of fluotitanic acid, silicon dioxide, and water. This composition is used in the manner known in the art for compositions containing hexavalent and trivalent chromium and dispersed silica, but it is much more stable to storage without phase separation.

Comparative Example 1

18.9 parts of aqueous 60% fluotitanic acid
363.6 parts of the 10% solution of water soluble polymer as used in Example 1
617.5 parts of deionized water Comparative Example 2

18.9 parts of aqueous 60% fluotitanic acid
71.8 parts of the 10% solution of water soluble polymer as used in Example 1
09.3 parts of deionized water For Comparative Examples 1 and 2 the components were added together with agitation in the order indicated, with no heating before use in treating metal surfaces.

Add-on mass levels, specific paints used, and test results with some of the compositions described above are shown in Tables 1–5 below.

TABLE 1

Panels Painted with PPG Duracron ™ 1000 White Single Coat Acrylic Paint

| Treatment | 2T Bend | Impact | Coating Weight | Boiling Water | HAc Salt Spray 504 Hours | Humidity 1008 Hrs. |
|---|---|---|---|---|---|---|
| Example 1 | 9 | 10 | 65 mg/m² as Ti | | e 0–1ˢ s 0–1ˢ | Vf9 |
| Example 1 | 9 | 10 | 43 mg/m² as Ti | | e 0–1ˢ s 0–1ˢ | Vf9 |
| Comparative Example 1 | 5 | 7 | 39 mg/m² as Ti | | e 0–1ˢ s 0–2ˢ | D9 |
| Comparative Example 1 | 0 | 0 | 27 mg/m² as Ti | | e 0–1ˢ s 0–2ˢ | D9 |
| Comparative Example 2 | 7 | 8 | 65 mg/m² as Ti | | e 0–1ˢ s 0–1² | Vf9 |
| Comparative Example 2 | 4 | 6 | 29 mg/m² as Ti | | e 0–1ˢ s 0–1² | Fm9 |

TABLE 2

Panels Painted with Lilly ™ Black Single Coat Polyester

| Treatment | 2T Bend | Impact | Coating Weight | Boiling Water | HAc Salt Spray 504 Hours | Salt Spray 1008 Hours | Humidity 1008 Hrs. |
|---|---|---|---|---|---|---|---|
| Example 2 | 10 | 10 | 54 mg/m² as Ti | | e 0–1ˢ s N | e N s N | Vf9 |
| Example 3 | 10 | 10 | 64 mg/m² as Ti | | e 0–2ˢ s 0–2ˢ | e 0–1ˢ s N | Vf9 |

TABLE 3

Panels Painted with Lilly ™ Colonial White Single Coat Polyester

| Treatment | 2T Bend | Impact | Coating Weight | Boiling Water | HAc Salt Spray 504 Hours | Salt Spray 1008 Hours | Humidity 1008 Hrs. |
|---|---|---|---|---|---|---|---|
| Example 4 | 5 | 8 | 65 mg/m² as Ti | | e N s N | e N s N | Vf9 |
| Example 5 | 10 | 10 | 22 mg/m² as Ti | | e N s N | e N s N | Vf9 |
| Example 5 | 10 | 10 | 54 mg/m² | | e N s N | e N s N | Vf9 |
| Example 6 | 10 | 10 | 22 mg/m² | | e 0–1ˢ s N | e N s N | Vf9 |
| Example 6 | 10 | 10 | 54 mg/m² | | e 0–1ˢ s N | e N s N | Vf9 |
| Example 8 | 9.8 | 10 | 12 mg/m² | | e N s 0–1ˢ | e N s N | N |
| Example 8 | 9.6 | 10 | 24 mg/m² | | e N s 0–1ˢ | e N s N | N |
| Example 9 | 10 | 10 | 11 mg/m² | | e N s 0–1ˢ | e N s 0–1ˢ | N |
| Example 9 | 9.8 | 10 | 24 mg/m² | | e 0–1ˢ s 0–1ˢ | e N s 0–1 | N |
| Example 10 | 9.8 | 9.8 | 17 mg/m² | | e 0–1ˢ s 0–1ˢ | e N s N | Vf9 |
| Example 10 | 9.9 | 10 | 25 mg/m² | | e 0–1ˢ s 0–1ˢ | e N s N | Vf9 |
| Example 10 | 9.9 | 10 | 33 mg/m² | | e 0–1ˢ s 0–1ˢ | e N s N | Vf9 |

TABLE 4

Panels Painted with Valspar/Desoto ™ White Single Coat Polyester

| Treatment | 2T Bend | Impact | Coating Weight | Boiling Water | HAc Salt Spray 1008 Hours | Salt Spray 1008 Hours | Humidity 1008 Hrs. |
|---|---|---|---|---|---|---|---|
| Example 2 | 10 | 10 | 39 mg/m² as Ti | | e 0–1ˢ s 0–1² | e N s N | Vf9 |
| Example 2 | 10 | 10 | 48 mg/m² as Ti | | e 0–1ˢ s 0–1ˢ | e N s N | Vf9 |
| Example 2 | 10 | 10 | 70 mg/m² as Ti | | e 0–2ˢ s 0–1ˢ | e N s N | Vf9 |
| Example 2 | 10 | 10 | 87 mg/m² as Ti | | e N s 0–1ˢ | e 0–1ˢ s N | Vf9 |
| Example 3 | 10 | 10 | 29 mg/m² as Ti | | e 0–2ˢ s 0–1ˢ | e N s N | Vf9 |
| Example 3 | 10 | 10 | 42 mg/m² as Ti | | e 0–1ˢ s 0–1ˢ | e N s N | Vf9 |
| Example 3 | 10 | 10 | 57 mg/m² as Ti | | e 0–1 s 0–1ˢ | e N s N | Vf9 |
| Example 3 | 10 | 10 | 82 mg/m² as Ti | | e 0–2ˢ s 0–2ˢ | e 0–1ˢ s N | Vf9 |
| Example 4 | 7 | 10 | 65 mg/m² as Ti | | e 0–1ˢ s 0–1ˢ | e N s N | Vf9 |

TABLE 5

Panels Painted with Valspar ™ Colonial White Single Coat Polyester

| Treatment | 2T Bend | Boiling Water Impact | Coating Weight | HAc Salt Spray 504 Hours | Salt Spray 1008 Hours | Humidity 1008 Hrs. |
|---|---|---|---|---|---|---|
| Example 2 | 10 | 10 | 54 mg/m² as Ti | e N s N | e N s N | Fm⁹ |
| Example 3 | 10 | 10 | 64 mg/m² as Ti | e 0–1ˢ s N | e 0–1ˢ s 0–1ˢ | Fm⁹ |

The storage stability of the compositions according to all of the examples above except Example 2 was so good that no phase separation could be observed after at least 1500 hours of storage. For Example 2, some settling of a slight amount of apparent solid phase was observable after 150 hours.

GROUP II

Components (A) and (B), with Spray Treatment)

To obtain the results reported below, an alternative process of treating the metal surfaces according to the invention and different aluminum alloys were used. Specifically, in part I of this Group, test pieces of Type 5352 or 5182 aluminum were spray cleaned for 10 seconds at 54.4° C. with an aqueous cleaner containing 24 g/L of PARCO® Cleaner 305 (commercially available from the Parker+Amchem Division of Henkel Corp., Madison Heights, Mich., USA). After cleaning, the panels were rinsed with hot water; then they were sprayed with the respective treatment solutions according to the invention, which were the same as those already described above with the same Example Number, except that they were further diluted with water to the concentration shown in the tables below, for 5 seconds; and then were rinsed successively with cold tap water and aleionized water and dried, prior to painting.

The "TO Bend" column in the following tables reports the result of a test procedure as follows:

1. Perform a O-T bend in accordance with ASTM Method D4145-83.
2. Firmly apply one piece of #610 Scotch® tape to the area of the test panel with the O-T bend and to the adjacent flat area.
3. Slowly pull the tape off from the bend and the adjacent flat area.
4. Repeat steps 2 and 3, using a fresh piece of tape for each repetition, until no additional paint is removed by the tape.
5. Report the maximum distance from the O-T bend into the flat area from which paint removal is observed according to the scale below:

| Paint loss in mm | Rating |
|---|---|
| 0 | 5.0 |
| 0.20 | 4.9 |
| 0.30 | 4.8 |
| 0.8 | 4.5 |
| 1.6 | 4.0 |
| 2.4 | 3.5 |
| 3.2 | 3.0 |
| 4.0 | 2.5 |
| 4.8 | 2.0 |
| 5.6 | 1.5 |
| 6.4 | 1.0 |
| 7.2 | 0.5 |
| >7.2 | 0 |

The "Ninety Minute Steam Exposure" columns of the tables below report the results of tests performed as follows:

1. Expose the painted samples to steam at a temperature of 120° C. steam for 90 minutes in a pressure cooker or autoclave.
2. Crosshatch the painted sample—two perpendicular cuts; a Gardner crosshatch tool with 11 knife edges spaced 1.5 mm apart was used.
3. Firmly apply #610 Scotch™ tape to the crosshatched area and remove tape.
4. Examine the crosshatched area for paint not removed by the tape and report a number representing one-tenth of the percentage of paint remaining.
5. Using a microscope at 10–80 times magnification, visually observe crosshatched area for blistering, and rate size and density of blisters.

The "15 Minute Boiling DOWFAX™2A1 Immersion" columns of the tables below report the results of tests performed after treatment as follows:

1. Prepare solution of 1% by volume of DOWFAX™2A1 in deionized water and bring to boil.
2. Immerse painted test panels in the boiling solution prepared in step 1 and keep there for 15 minutes; then remove panels, rinse with water, and dry.

DOWFAX™2A1 is commercially available from Dow Chemical and is described by the supplier as 45% active sodium dodecyl diphenyloxide disulfonate. The "Cross Hatch" test after this treatment was made in the same way as described above for steps 2–4 after "Ninety Minute Steam Exposure". The "Reverse Impact" test was made as described in ASTM D2794-84E1 (for 20 inch pounds impact), then proceeding in the same way as described above for steps 3–4 after "Ninety Minute Steam Exposure". The "Feathering" test was performed as follows: Using a utility knife, scribe a slightly curved "V" on the back side of the test panel. Using scissors, cut up about 12 millimeters from the bottom along the scribe. Bend the inside of the V away from side for testing. Place sample in a vise and, using pliers, pull from the folded section with a slow continuous motion. Ignore the part of the panel between the top edges nearest to the vertex and a line parallel to the top edge but 19 mm away from it. On the remainder of the panel, measure to edge of feathering in millimeters. Record the largest value observed.

The results of tests according to these procedures are shown in Tables 6–8 below.

TABLE 6

5352 Alloy Panels Painted with Valspar ™ S-9009-139 Paint

| Invention Composition | Concentration | pH | Coating Weight | OT Bend | Cross Hatch | Ninety Minute Steam Exposure Blistering |
|---|---|---|---|---|---|---|
| Example 1 | 1% | 2.7 | 4.0 mg/m² as Ti | 5 | 10 | Very few, small-medium |
| Example 1 | 1% | 3.2 | 11.4 mg/m² as Ti | 5 | 10 | few, small |
| Example 1 | 3% | 2.5 | 2.3 mg/m² as Ti | 5 | 10 | very few, very small |
| Clean only (Comparison) | N/A | | | 1.5 | 10 | few, medium |

TABLE 7

5352 Alloy Panels Painted with Valspar ™ S-9009-154 Paint

| Invention Composition | Concentration | pH | Coating Weight | OT Bend | Cross Hatch | Ninety Minute Steam Exposure Blistering |
|---|---|---|---|---|---|---|
| Example 1 | 1% | 2.9 | 4.2 mg/m² as Ti | 5 | 9–10 | Very few, small |
| Emample 1 | 3% | 2.7 | 2.6 mg/m² as Ti | 5 | 9–10 | very few, very small |

TABLE 8

5182 alloy panels Painted with Valspar ™ S-9835002 Paint

| Invention Composition | Concentration | pH | Coating Weight | Cross Hatch | Reverse Impact | 15 Minute Boiling DOWFAX ™ 2A1 Immersion Feathering |
|---|---|---|---|---|---|---|
| Example 1 | 1% by weight | 2.9 | 7.9 mg/m² as Ti | 10 | 10 | 0.35 mm |

In part II of this Group, Type 5352 aluminum was used, and the process sequence used in part I, except for final drying, was used but was then followed by passing the test pieces, still wet from the deionized water rinse after contact with a composition according to this invention, through power driven squeegee rolls arranged so that the test pieces passed through the squeegee rolls in a horizontal position immediately after being sprayed liberally with the final treatment liquid composition at a temperature of 60° C. before being dried. In Examples 11 and 13 the treatment liquid in this final stage was simply deionized water with a conductivity of not more than 4.0 µSiemens/cm, while in Example 12 the treatment liquid in this final stage was obtained by mixing 35 ml of Parcolene™ 95AT and 2.0 ml of Parcolene™ 88B with 7 liters of deionized water and had a pH of 5.18 and a conductivity of 56 µSiemens/cm. (Both Parcolene™ products noted are commercially available from the Parker+Amchem Div. of Henkel Corp., Madison Heights, Mich.) This latter type of final treatment liquid is an example of one containing polymers and/or copolymers of one or more x-(N-R$^1$-N-R$^2$-aminomethyl)-4-hydroxy-styrenes as already described above.

Concentrate II—II used in each of Examples 11–13 had the following composition:

1892.7 parts of aleionized water 83.7 parts of 60% aqueous fluotitanic acid 5.3 parts of Cab-O-Sil™ M-5 fumed amorphous silicon dioxide 18.3 parts of zirconium basic carbonate.

These ingredients were simply mixed together with mechanical agitation in the order shown, with a pause after each addition until the solution became optically clear. Although the partial mixture was not transparent immediately after addition of the silicon dioxide, it became clear after a few minutes of mixing, even without any heating.

The working solution for Examples 11 and 12 was prepared by diluting 200 grams of the concentrate II—II, along with sufficient sodium carbonate to result in a pH of 2.92±0.2, to form 6 liters of working composition. For Example 13, the working solution was made in the same way, except that it also contained 5 grams of a concentrated polymer solution made according to the directions of column 11 lines 39–49 of U.S. Pat. No. 4,963,596, except as follows: The preparation was carried out on a substantially larger scale; the proportions of ingredients were changed to the following: 241 parts of Propasol™ P, 109 parts of Resin M, 179 parts of N-methylglucamine, 73.5 parts of aqueous 37% formaldehyde, and 398 parts of aleionized water, of which 126 parts were reserved for a final addition not described in the noted patent, with the remainder used to slurry the N-methylglucamine as noted in the patent; and the temperature noted as 60°–65 ° C. in the patent was reduced to 57° C.

The dried test panels were then coated with Valspar™ 9009-157 paint according to the directions of the paint supplier, and the paint coated panels were tested as described for the tests of the same name in part I of Group II. Results are shown in Table 9.

TABLE 9

| Example Number | mg of Ti/m² | 90 Minute Steam Exposure |  |  |
|---|---|---|---|---|
| | | O-T Bend | Cross Hatch | Blistering |
| 11 | 3.6 | 4.5 | 10 | 4.5 |
| 12 | 4.6 | 4.9 | 10 | 4.5 |
| 13 | 5.4 | 4.8 | 10 | 4.0 |

GROUP III, WITH NECESSARY COMPONENTS (A') AND (B')

Example 14

A first concentrate was made by mixing 750 parts of tap water and 274 parts of Acrysol™ A-1, a commercially available product from Rohm and Haas containing 25% solids of polymers of acrylic acid with a molecular weight of less than 50,000. A second concentrate was made by mixing, in a container separate from that used for the first concentrate 951.3 parts of tap water and 66.7 g/l of Gohsenol™ GLO-5, a commercially available product from Nippon Gohsei which is a low molecular weight polyvinyl alcohol; the latter was added to the tap water with stirring at a slow and controlled flow, after which the temperature was increased to 49°–54° C. for 30 minutes with slow stirring until all was dissolved.

An amount of these concentrates equal, for each concentrate separately, to 6 volume % of the final volume of composition ready for treating a metal surface according to this invention, was then added with stirring at ambient temperature to a large excess of water, and after addition of both concentrates, additional water was added to reach the final volume of treatment composition, which contained 4.1 g/l of polyacrylic acid and 4.0 g/l of polyvinyl alcohol.

This composition was then contacted with an aluminum surface by dipping or spraying for a time from 30 to 60 seconds, after which time the surfaces treated were removed from contact with the treating composition, allowed to dry in the ambient atmosphere without rinsing, and then baked in a warm air oven at 88° C. for 5 minutes to simulate commercial operating conditions. The surfaces thus prepared were painted painted with conventional paints.

Examples 15–20

In each of these examples, the treating composition is prepared in the same general manner as in Example 14, by making separate concentrates of the hydroxyl group containing polymer and polyacrylic acid components, mixing an appropriate amount of these concentrates with a larger volume of water, adding any additional components used, and finally adjusting to the final desired volume or mass by the addition of more water. These compositions are then applied to aluminum surfaces in the same manner as described for Example 14. The specific active ingredients and concentrations or amounts thereof in the treatment composition for each example are as follows:

Example 15: 4.1 g/l of Acrysol™ A-1; 4.0 g/l of Gohsenol™ GLO-5; and 1.2 g/l of hexafluorozirconic acid.

Example 16: 4.1 g/l of Acrysol™ A-1 and 0.6 g/l of polyethylene glycol having a molecular weight of less than about 600,000.

Example 17: 4.1 g/l of Acrysol™ A-1; 0.6 g/l of polyethylene glycol having a molecular weight of less than about 600,000; and 1.2 g/l of hexafluorozirconic acid.

Example 18: 4.1 g/l of Acrysol™ A-1 and 0.8 g/l of dextrin.

Example 19: 4.1 g/l of Acrysol™ A-1; 0.8 g/l of dextrin; and 1.2 g/l of hexafluorotitanic acid.

Example 20: 651.4 parts of deionized water; 83.7 parts of 60% aqueous fluotitanic acid; 5.3 parts of Cab-O-Sil™ M-5 fumed amorphous silicon dioxide; 14.6 parts of zirconium basic carbonate; 200.0 parts of Accumer™ 1510, a commercially available product from Rohm and Haas containing 25% solids of polymers of acrylic acid with a molecular weight of about 60,000; and 55.0 parts of Gohsenol™ GLO-5.

The invention claimed is:

1. An aqueous liquid composition suitable for treating aluminum and alloys thereof, said composition consisting essentially of water and:

(A') from about 0.5 to about 50 g/l of a water soluble or dispersible polymer selected from the group consisting of polyvinyl alcohol, polyethylene glycol, modified starch, and mixtures thereof;

(B') from about 0.5 to about 50g/l of polymers and copolymers of acrylic and methacrylic acid and their salts;

(C') a component selected from the group consisting of $H_2TiF_6$, $H_2ZrF_6$, $H_2HfF_6$, $H_3AlF_6$, $H_2SiF_6$, $H_2GeF_6$, $H_2SnF_6$, $HBF_4$, and mixtures thereof; and, optionally, one or more of the following components:

(D') a component selected from the group consisting of the water insoluble oxides, water insoluble hydroxides, water insoluble carbonates, and water insoluble elemental forms of all of titanium, zirconium, hafnium, boron, aluminum, silicon, germanium, and tin; and (E') a component selected from the group consisting of water soluble oxides, water soluble carbonates, and water soluble hydroxides of all of Ti, Zr, Hf, B, Al, Si, Ge, and Sn.

2. An aqueous liquid composition according to claim 1 having a pH value from about 1.0 to about 5.0 and consisting essentially of water and:

(A') from about 0.5 to about 50 g/l of a water soluble or dispersible polymer selected from the group consisting of polyvinyl alcohol, polyethylene glycol, modified starch, and mixtures thereof;

(B') from about 0.5 to about 50 g/l of polymers and copolymers of acrylic and methacrylic acid and their salts;

(C') from about 0.01 to about 7M total of fluroacid selected from the group consisting of $H_2TiF_6$, $H_2ZrF_6$, $H_2HfF_6$, $H_3AlF_6$, $H_2SiF_6$, $H_2GeF_6$, $H_2SnF_6$, $HBF_4$, and mixtures thereof; and, optionally, one or more of the following components:

(D') a component selected from the group consisting of the water insoluble oxides, water insoluble hydroxides, water insoluble carbonates, and water insoluble elemental forms of all of titanium, zirconium, hafnium, boron, aluminum, silicon, germanium, and tin and (E') a component selected from the group consisting of water soluble oxides, water soluble carbonates, and water soluble hydroxides of all of Ti, Zr, Hf, B, Al, Si, Ge, and Sn.

3. An aqueous liquid composition according to claim 2 wherein component A' is polyvinyl alcohol.

4. An aqueous liquid composition according to claim 3 wherein component (B') is polyacrylic acid having an average molecular weight of about 50,000.

5. An aqueous liquid composition according to claim 4 wherein said polyvinyl alcohol has a degree of polymerization from about 100 to about 600.

6. An aqueous liquid composition according to claim 3 wherein component (C') is $H_2ZrF_6$, $H_2TiF_6$, or a mixture thereof.

7. An aqueous liquid composition according to claim 6 wherein component (B') is polyacrylic acid having an average molecular weight of about 50,000.

8. An aqueous liquid composition according to claim 7 wherein said polyvinyl alcohol has a degree of polymerization from about 100 to about 600, and is present in an amount of from about 0.5 to about 16 g/l.

9. An aqueous liquid composition according to claim 1 wherein component (A') is polyethylene glycol.

10. An aqueous liquid composition according to claim 9, wherein component (B') is polyacrylic acid having an average molecular weight of about 50,000.

11. An aqueous liquid composition according to claim 10 wherein said polyethylene glycol has a molecular weight of from about 90,000 to about 900,000 and is present in an amount of from about 0.3 to about 16 g/l.

12. An aqueous liquid composition according to claim 2 wherein component A' is polyethylene glycol having a molecular weight of from about 90,000 to about 900,000 and is present in an amount of from about 0.3 to about 16 g/l, and said fluoroacid is $H_2ZrF_6$, $H_2TiF_6$, or a mixture thereof.

13. An aqueous liquid composition according to claim 12, wherein component (B') is polyacrylic acid having an average molecular weight of about 50,000.

14. An aqueous liquid composition according to claim 1 wherein component A' is modified starch.

15. An aqueous liquid composition according to claim 14, wherein component (B') is polyacrylic acid having an average molecular weight of about 50,000.

16. An aqueous liquid composition according to claim 15 wherein said modified starch is a cyclodextrin and is present in an amount of from about 0.5 to about 16 g/l.

17. An aqueous liquid composition according to claim 2 wherein component (A') is modified starch present in an amount of from about 0.5 to about 16 g/l, and component (C') is $H_2ZrF_6$, $H_2TiF_6$, or a mixture thereof.

18. An aqueous liquid composition according to claim 17, wherein component (B') is polyacrylic acid having an average molecular weight of about 50,000.

19. An aqueous liquid composition according to claim 1 having a pH in the range from about 1.0 to 5.0.

20. An aqueous liquid composition according to claim 2 having a pH in the range from about 1.0 to 3.5.

21. A process for treating aluminum and alloys thereof comprising contacting said aluminum with an aqueous liquid composition comprising water and:
  (A') from about 0.5 to about 50 g/l of a water soluble or dispersible polymer selected from the group consisting of polyvinyl alcohol, polyethylene glycol, modified starch, and mixtures thereof;
  (B') from about 0.5 to about 50 g/l of polymers and copolymers of acrylic and methacrylic acid and their salts;
  (C') a component selected from the group consisting of $H_2TiF_6$, $H_2ZrF_6$, $H_2HfF_6$, $H_3AlF_6$, $H_2SiF_6$, $H_2GeF_6$, $H_2SnF_6$, $HBF_4$, and mixtures thereof; and, optionally, one or more of the following components:
  (D') a component selected from the group consisting of the water insoluble oxides, water insoluble hydroxides, water insoluble carbonates, and water insoluble elemental forms of all of titanium, zirconium, hafnium, boron, aluminum, silicon, germanium, and tin; and
  (E') a component selected from the group consisting of water soluble oxides, water soluble carbonates, and water soluble hydroxides of all of Ti, Zr, Hf, B, Al, Si, Ge, and Sn.

22. A process according to claim 21, wherein the aqueous liquid composition comprises water and:
  (A') from about 0.5 to about 50 g/l of a water soluble or dispersible polymer selected from the group consisting of polyvinyl alcohol, polyethylene glycol, modified starch, and mixtures thereof;
  (B') from about 0.5 to about 50 g/l of polymers and copolymers of acrylic and methacrylic acid and their salts;
  (C') from about 0.01 to about 7M total of fluroacid selected from the group consisting of $H_2TiF_6$, $H_2ZrF_6$, $H_2HfF_6$, $H_3AlF_6$, $H_2SiF_6$, $H_2GeF_6$, $H_2SnF_6$, $HBF_4$, and mixtures thereof; and, optionally, one or both of the following components:
  (D') a component selected from the group consisting of the water insoluble oxides, water insoluble hydroxides, water insoluble carbonates, and water insoluble elemental forms of all of titanium, zirconium, hafnium, boron, aluminum, silicon, germanium, and tin and
  (E') a component selected from the group consisting of water soluble oxides, water soluble carbonates, and water soluble hydroxides of all of Ti, Zr, Hf, B, Al, Si, Ge, and Sn.

23. A process according to claim 21 wherein component (A') is polyvinyl alcohol.

24. A process according to claim 23 wherein, in said aqueous liquid composition, component (B') is polyacrylic acid having an average molecular weight of about 50,000.

25. A process according to claim 24 wherein said polyvinyl alcohol has a degree of polymerization from about 100 to about 600 and is present in the aqueous liquid composition in an amount of from about 0.5 to about 16 g/l.

26. A process according to claim 22 wherein component A' is polyvinyl alcohol and said fluoroacid is $H_2TiF_6$ or $H_2TiF_6$.

27. A process according to claim 26 wherein, in said aqueous liquid composition, component (B') is polyacrylic acid having an average molecular weight of about 50,000.

28. A process according to claim 27 wherein said polyvinyl alcohol has a degree of polymerization from about 100 to about 600 and is present in said aqueous liquid composition in an amount of from about 0.5 to about 16 g/l.

29. A process according to claim 21 wherein component (A') is polyethylene glycol.

30. A process according to claim 29 wherein, in said aqueous liquid composition, component (B') is polyacrylic acid having an average molecular weight of about 50,000.

31. A process according to claim 30 wherein said polyethylene glycol has a molecular weight of from about 90,000 to about 900,000 and is present in said composition in an amount of from about 0.3 to about 16 g/l.

32. A process according to claim 22 wherein component (A') is polethylene glycol having a molecular weight of from about 90,000 to about 900,000, and is present in said aqueous liquid composition in an amount of from about 0.3 to about 16 g/l, and said fluoroacid is $H_2ZrF_6$ or $H_2TiF_6$.

33. A process according to claim 32 wherein, in said aqueous liquid composition, component (B') is polyacrylic acid having an average molecular weight of about 50,000.

34. A process according to claim 21 wherein component (A') is modified starch.

35. A process according to claim 34 wherein, in the aqueous liquid composition, component (B') is polyacrylic acid having an average molecular weight of about 50,000.

36. A process according to claim 35 wherein said modified starch is a cyclodextrin and is present in an amount of from about 0.5 to about 16 g/l.

37. A process according to claim 22 wherein component (A') is modified starch present in said composition in an amount of from about 0.5 to about 16 g/l, and said fluoroacid is $H_2TiF_6$.

38. A process according to claim 37 wherein, in said aqueous liquid composition, component (B') is polyacrylic acid having an average molecular weight of about 50,000.

39. A process according to claim 21, wherein the aqueous liquid composition has a pH in the range from about 1.0 to 5.0.

40. A process according to claim 22, wherein the aqueous liquid composition has a pH in the range from about 1.0 to 3.5.

\* \* \* \* \*